US008385721B2

(12) United States Patent
Huber et al.

(10) Patent No.: US 8,385,721 B2
(45) Date of Patent: Feb. 26, 2013

(54) MEDIA PLAYLIST METHODS AND APPARATUS (75) Inventors: Michael Huber, Farsta (SE); Johan Kwarnmark, Hässelby (SE); Johan Svedberg, Stockholm (SE); Ola Andersson, Spånga (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 122 days.

(21) Appl. No.: 12/877,216

(22) Filed: Sep. 8, 2010

(65) Prior Publication Data
US 2012/0057853 A1 Mar. 8, 2012

(51) Int. Cl.
*H04N 5/76* (2006.01)

(52) U.S. Cl. ........ 386/292; 386/293; 386/294; 386/296; 386/298; 386/299

(58) Field of Classification Search .......... 386/292–299
See application file for complete search history.

(56) References Cited

U.S. PATENT DOCUMENTS

| | | | | |
|---|---|---|---|---|
| 5,479,266 | A * | 12/1995 | Young et al. .................. | 386/297 |
| 6,208,799 | B1 * | 3/2001 | Marsh et al. .................. | 386/292 |
| 6,760,538 | B1 * | 7/2004 | Bumgardner et al. ........ | 386/291 |
| 6,953,886 | B1 | 10/2005 | Looney et al. | |
| 7,205,471 | B2 | 4/2007 | Looney et al. | |
| 7,461,343 | B2 | 12/2008 | Kates | |
| 7,812,826 | B2 | 10/2010 | Ording et al. | |
| 2006/0184966 | A1 | 8/2006 | Hunleth et al. | |
| 2007/0253682 | A1 | 11/2007 | Chang et al. | |
| 2009/0060469 | A1 * | 3/2009 | Olague et al. .................. | 386/124 |
| 2009/0129738 | A1 * | 5/2009 | Morimoto ........................ | 386/52 |
| 2009/0263101 | A1 * | 10/2009 | Rudolph et al. .................. | 386/92 |
| 2009/0317056 | A1 * | 12/2009 | Hu et al. .......................... | 386/83 |
| 2010/0180298 | A1 | 7/2010 | Kim et al. | |
| 2010/0329643 | A1 * | 12/2010 | Kuang ............................ | 386/292 |
| 2011/0138432 | A1 | 6/2011 | Mitra et al. | |

FOREIGN PATENT DOCUMENTS

JP 2008258894 A 10/2008

OTHER PUBLICATIONS

Backbone Video Preliminary Product Information, 2004, pp. 1-2, Backbone Networks Corp.

* cited by examiner

*Primary Examiner* — Helen Shibru
(74) *Attorney, Agent, or Firm* — Potomac Patent Group PLLC (57) ABSTRACT Methods and apparatus for easily creating playlists of media programs to be played sequentially, where each program on a playlist either is played in real time, i.e., when broadcast, or is played time-shifted when the program temporally conflicts with one or more other programs on the playlist. When a playlist is played, a user can pause viewing at any time, in which case the methods and apparatus recompute the program sequence of the playlist and schedules program recordings as required.

21 Claims, 7 Drawing Sheets

MEDIA PLAYLIST METHODS AND APPARATUS

TECHNICAL FIELD

This invention relates to methods and devices for receiving and displaying electronic media information and more particularly to methods and devices for generating and using playlists of media information.

BACKGROUND

Today's homes and offices often include a wide variety of electronic media devices, such as televisions (TVs), set-top boxes (STBs), and media players/recorders, such as digital video recorders (DVRs), and devices equipped with browsers and players for accessing electronic media available on the Internet. Such electronic media devices often can be operated by remote controls that transmit optical or radio frequency (RF) signals to complementary receivers in the electronic devices.

Remote controls include devices having a variety of push buttons that can interact with a variety of menus presented to a user on a TV or other display in a graphical user interface (GUI). Remote controls having touch-sensitive screens are becoming more widely available today. In particular, touch-sensitive screens are more and more common on mobile phones, tablet and netbook computers, and other portable electronic devices, and the electronic processors in such devices can be programmed to operate home electronic media devices.

Electronic media devices are known that enable users to set up program reminders so that a device, such as a TV, automatically starts and tunes to a desired program, and users today can often program such operations via GUIs and their remote controls. If a user wants to watch a set of programs that will be presented on a set of different channels, the user must either use a program guide and switch between channels when a desired program starts or program in advance a set of reminders with a set of commands on the remote control. After set up is complete, which is to say, after the user has manually created a "playlist" of programs, viewing can begin.

Familiar problems arise when the start times and durations of programs conflict with each other and/or when a user must attend to another activity during a program. In the latter case, a user must set up recording of one or more programs with yet another set of commands on the remote control and media device. If the user wants to pause viewing a program after the program playlist has been set up, parts of the set up procedure can need to be manually repeated. In short, it is currently difficult for users to create playlists of programs that the users want to view in "real time", i.e., when they are presented.

Personal DVRs today also typically are technically restricted with respect to the number of simultaneous recordings they can make by limited bandwidth to the home and STB input/output (I/O) limitations. Recording more than one or two programs simultaneously with a personal DVR is usually not possible. DVR functionality can be provided outside the home, in the communication network, that does not suffer from the limitations of personal DVRs, but network DVRs are typically subject to other limitations, e.g., limitations arising from digital rights management considerations. As a result, either a network DVR is not available at all, or it may be available for only some programs and/or channels.

Some approaches to creating media program playlists are known. For example, Backbone Networks Corp. announced in 2004 a Backbone Video product that enabled Internet TV streaming, with creation and automation of programs and schedules by dragging and dropping video/audio files onto a program playlist. Information on the Backbone Video product is available at www.backbone.com. For another example, U.S. Patent Application Publication No. US 2010/0180298 by Kim et al. states that it relates to a terminal device coupled to a broadcasting receiving apparatus. The terminal device includes a communication unit which receives electronic program guide (EPG) information from the Internet, a display unit that displays EPG information, and a control unit that controls the broadcasting receiving apparatus to perform an operation corresponding to a selection.

Nevertheless, prior approaches to creation and use of "live" program playlists do not resolve the problems described above.

SUMMARY

In accordance with aspects of this invention, there is provided a method of generating a playlist of media programs in an arrangement of electronic media devices that includes at least one programmable media recorder. The method includes (a) adding a media program to a playlist maintained by an electronic processor; (b) determining by the electronic processor whether the added media program is preferred to be viewed in a first condition or in a second condition; (c) if the electronic processor determines that the added media program is preferred to be viewed in the first condition: setting the programmable media recorder to record the added media program; determining whether the added media program temporally conflicts with any previously added program in the playlist; if it is determined that the added media program does not temporally conflict with any previously added program in the playlist, placing the added media program in the playlist at a transmission time of the added media program; and if it is determined that the added media program temporally conflicts with a previously added program in the playlist, determining a temporal gap in the playlist long enough to accommodate the added media program, and placing the added media program in the temporal gap; and (d) if the electronic processor determines that the added media program is preferred to be viewed in the second condition: determining whether the added media program temporally conflicts with any previously added program in the playlist; if it is determined that the added media program temporally conflicts with a previously added program in the playlist that has been determined to be viewed in the second condition, carrying out step (c); if it is determined that the added media program does not temporally conflict with any previously added program in the playlist that has been determined to be viewed in the second condition, placing the added media program in the playlist at a transmission time of the added media program; determining whether the added media program temporally conflicts with any previously added program in the playlist that has been determined to be viewed in the first condition; if it is determined that the added media program temporally conflicts with a previously added program in the playlist that has been determined to be viewed in the first condition, determining a temporal gap in the playlist long enough to accommodate the previously added media program that has been determined to be viewed in the first condition, and placing in the temporal gap the previously added media program that has been determined to be viewed in the first condition.

Also in accordance with aspects of this invention, there is provided an arrangement of electronic media devices for generating and using a playlist of media programs. The arrangement includes at least one programmable media recorder; and at least one programmable electronic processor in communication with the at least one programmable media recorder. The processor is configured to: (a) add a media program to a playlist; (b) determine whether the added media program is preferred to be viewed in a first condition or in a second condition; (c) if the processor determines that the added media program is preferred to be viewed in the first condition: set the programmable media recorder to record the added media program; determine whether the added media program temporally conflicts with any previously added program in the playlist; if it is determined that the added media program does not temporally conflict with any previously added program in the playlist, place the added media program in the playlist at a transmission time of the added media program; and if it is determined that the added media program temporally conflicts with a previously added program in the playlist, determine a temporal gap in the playlist long enough to accommodate the added media program, and place the added media program in the temporal gap; and (d) if the processor determines that the added media program is preferred to be viewed in the second condition: determine whether the added media program temporally conflicts with any previously added program in the playlist; if it is determined that the added media program temporally conflicts with a previously added program in the playlist that has been determined to be viewed in the second condition, carry out (c); if it is determined that the added media program does not temporally conflict with any previously added program in the playlist that has been determined to be viewed in the second condition, place the added media program in the playlist at a transmission time of the added media program; determine whether the added media program temporally conflicts with any previously added program in the playlist that has been determined to be viewed in the first condition; and if it is determined that the added media program temporally conflicts with a previously added program in the playlist that has been determined to be viewed in the first condition, determine a temporal gap in the playlist long enough to accommodate the previously added media program that has been determined to be viewed in the first condition, and place in the temporal gap the previously added media program that has been determined to be viewed in the first condition.

Also in accordance with aspects of this invention, there is provided a computer-readable medium having stored instructions that, when executed by a computer, cause the computer to carry out a method of generating and using a playlist of media programs in an arrangement of electronic media devices that includes at least one programmable media recorder. The method includes (a) adding a media program to a playlist maintained by an electronic processor; (b) determining by the electronic processor whether the added media program is preferred to be viewed in a first condition or in a second condition; (c) if the electronic processor determines that the added media program is preferred to be viewed in the first condition: setting the programmable media recorder to record the added media program; determining whether the added media program temporally conflicts with any previously added program in the playlist; if it is determined that the added media program does not temporally conflict with any previously added program in the playlist, placing the added media program in the playlist at a transmission time of the added media program; and if it is determined that the added media program temporally conflicts with a previously added program in the playlist, determining a temporal gap in the playlist long enough to accommodate the added media program, and placing the added media program in the temporal gap; and (d) if the electronic processor determines that the added media program is preferred to be viewed in the second condition: determining whether the added media program temporally conflicts with any previously added program in the playlist; if it is determined that the added media program temporally conflicts with a previously added program in the playlist that has been determined to be viewed in the second condition, carrying out step (c); if it is determined that the added media program does not temporally conflict with any previously added program in the playlist that has been determined to be viewed in the second condition, placing the added media program in the playlist at a transmission time of the added media program; determining whether the added media program temporally conflicts with any previously added program in the playlist that has been determined to be viewed in the first condition; if it is determined that the added media program temporally conflicts with a previously added program in the playlist that has been determined to be viewed in the first condition, determining a temporal gap in the playlist long enough to accommodate the previously added media program that has been determined to be viewed in the first condition, and placing in the temporal gap the previously added media program that has been determined to be viewed in the first condition.

BRIEF DESCRIPTION OF THE DRAWINGS

The several features, objects, and advantages of this invention will be understood by reading this description in conjunction with the drawings, in which like reference characters indicate like parts and.

DETAILED DESCRIPTION

In this description, the term "remote control" means any kind of device that has a touch-sensitive screen and programmable electronic processor and that is used to control the operation of an other electronic device by sending one or more appropriate commands directly, e.g., by line-of-sight or RF signals, or indirectly, e.g., by wired or wireless Ethernet or other network signals, to the other electronic device. This invention describes methods and apparatus for easily creating playlists of media programs to be played sequentially, where each program on a playlist either is played in real time, i.e., when broadcast, or is played time-shifted when the program temporally conflicts with one or more other programs on the playlist. When a playlist is played, the user can pause viewing at any time, in which case the methods and apparatus recompute the program sequence of the playlist and schedules program recordings as required.

Figure 1:
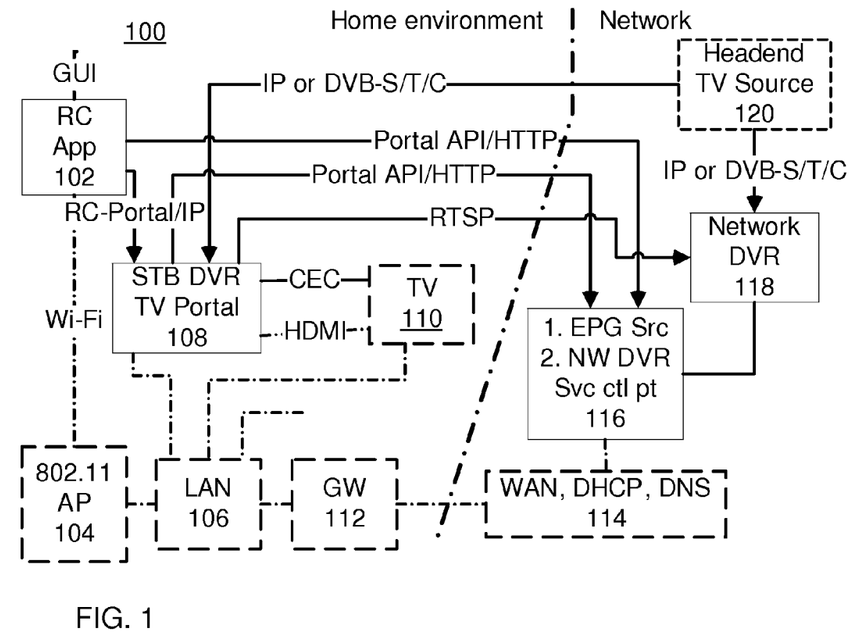
FIG. 1 depicts an exemplary arrangement of electronic devices for delivering media to a user.

FIG. 1 depicts an exemplary arrangement 100 of electronic media and network devices that extend from a user's home environment to an external network, such as the Internet, a cellular radio communication network, a fiber optic cable network, etc. In FIG. 1, solid connecting lines generally indicate logical connections between devices or nodes and dashed connecting lines generally indicate physical connections, such as wired or wireless connections. Blocks indicated by dashed lines can be considered infrastructure nodes or entities of the arrangement 100. The artisan will understand that the arrangement 100 is simply one possible example and that the entities depicted in FIG. 1 as well as entities not shown can be connected in many equivalent arrangements.

A user interacts with the arrangement 100 through a GUI and a remote control (RC) 102, such as a tablet computer having a touch screen and a software program for remote control. As depicted in FIG. 1, the remote control 102 is physically connected to other devices in the arrangement 100 through a wireless communication link to a wireless access point (AP) 104, such as a Wi-Fi link according to the IEEE 802.11 a/b/g/n standards. The AP 104 is physically connected to a router 106 in the user's local area network (LAN), which is conveniently an Ethernet network, and the router 106 provides physical connections to a STB and/or local DVR that act as a TV portal 108, a TV 110, and a residential gateway (GW) 112 to the external network, such as suitable modem. The GW 112 exchanges information with the external wide area network (WAN) 114 after configuration according to the standard dynamic host configuration protocol (DHCP), and the WAN 114 typically includes a domain name server (DNS) for resolving internet addresses. Of interest to this application is the connection that the GW 112 can provide between the home environment and a media portal node 116 in the external network that represents a source of EPG information and a service control point for a network (NW) DVR 118. The media portal node 116 controls the operation of the NW DVR 118 in a suitable way and thereby controls access to a headend source 120 or media program material, such as TV programs.

As depicted in FIG. 1, the RC 102 is logically connected to the TV portal 108, and messaging between the devices 102, 106 can use a dedicated RC-portal protocol using the standard Internet Protocol (IP), or any other suitable messaging protocol. The RC 102 is also logically connected to the media portal node 116, and messaging between the device 102 and an application program interface (API) in the media portal node 116 can use the standard hypertext transfer protocol (HTTP) or any other suitable messaging protocol.

In a similar way, the TV portal 108 is logically connected to the media portal node 116, and messaging between the device 108 and an API in the media portal node 116 can use HTTP or any other suitable messaging protocol. The TV portal 108 is also logically connected to the NW DVR 118, and communication between the devices 108, 118 can use the standard real time streaming protocol (RTSP) or any other suitable media delivery protocol. The TV portal 108 is also logically connected to the headend source 120, and communication between the devices 108, 120 can use IP, one of the digital video broadcast (DVB) protocols, such as DVB-satellite, DVB-terrestrial, or DVB-cable, or any other suitable media delivery protocol.

Also as depicted in FIG. 1, the TV portal 108 and the TV 110 are physically connected, for example by a high-definition multimedia interface (HDMI) or other suitable connection, and they are logically connected by a consumer electronics control (CEC) connection that uses a standard AV.link protocol to perform remote control functions. A user of the remote control 102 indicates a command to the arrangement by a corresponding action or gesture on a suitable touch- or proximity-sensitive screen or other input device of the remote control 102.

Figure 2:
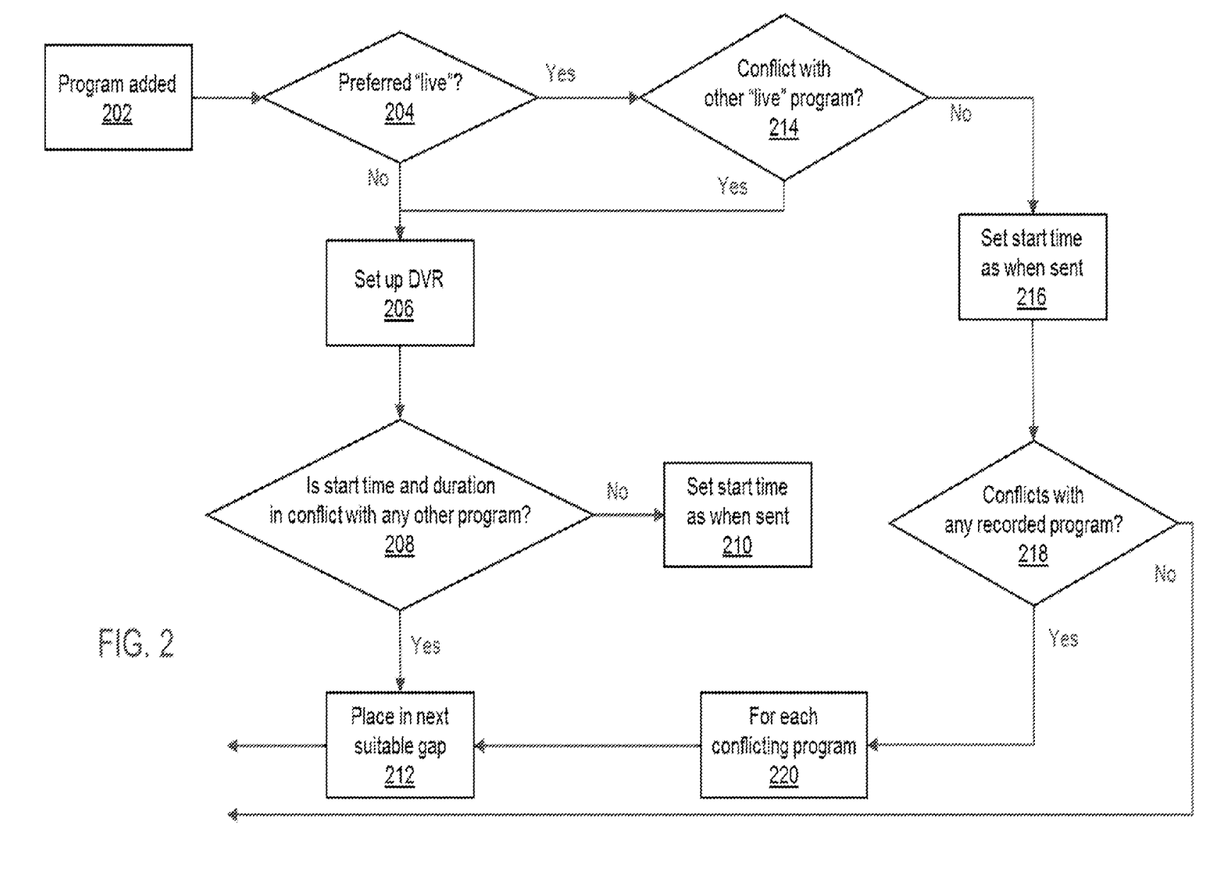
FIG. 2 is a flow chart of an exemplary method of generating a playlist of media information.

FIG. 2 is a flow chart of an exemplary method of generating a playlist of media information in accordance with this invention that can be carried out by one or more programmable electronic processors in the arrangement 100. A user can advantageously carry out program selection steps using a suitable remote control device 102 having a touch-sensitive screen, and many such devices are currently commercially available.

In accordance with this invention, a playlist of the user-selected programs is generated that has the selected programs placed in a temporal sequence in which they will be presented to the user, starting when the first program in the playlist starts. When the first program ends, the second program in the playlist starts, and so forth. If there is a temporal gap in the selected programs, any recorded program in the playlist is played if it fits in the gap. When all "live" programs are played any DVR-recorded programs are shown.

In step 202, a user-selected program is added to the playlist. For example, the user can view a program guide on either or both of the remote control 102 and the TV 110 that lists start times and durations of available programs and can select one or more programs by dragging and dropping the corresponding one or more guide entries onto a playlist icon or area on the TV display. As an alternative to drag-and-drop selection, the user can simply double-click on a program entry in the guide or otherwise indicate selection of the program. The artisan will understand that the program guide can be presented on any suitable screen, such as the TV 110, part of the remote control 102, or another display, and that program selection for playlist creation can be done in many equivalent ways.

In step 204, it is determined whether the added program is preferred to be viewed "live". This determination can be made based on either an explicit instruction by the user or stored user-defined preferences, e.g., that sports events are preferred "live". If not (No in step 204), either or both of the programmable DVRs 108, 118 is set up to record the added program (step 206). In the case of the DVR 118, the media portal node 116 can be configured to carry out the set up as appropriate.

It is determined (step 208), based on the program's start time and duration, whether the added program to be recorded can be viewed when it is transmitted ("aired"), i.e., whether the added program temporally conflicts with any previously added program. If there is no conflict (No in step 208), the added program to be recorded is placed in the playlist's time line at the program's transmission time (step 210). If a temporal conflict is detected (Yes in step 208), the next suitable gap in the playlist is determined and the added program is placed in that gap (step 212). A suitable gap is any gap starting after the start time of the added program to be recorded and having a duration that equals or is longer than the duration of the added program to be recorded. The playlist now includes the added program to be recorded, and the flow can continue, for example to displaying on the TV 110 the programs in the temporal sequence given by the playlist.

If it is determined that the added program is preferred to be viewed "live" (Yes in step 204), it is determined (step 214), based on the program's start time and duration, whether the added program temporally conflicts with any previously added "live" program in the playlist. If so (Yes in step 214), the added program is handled as a recorded program, with the process flow moving to step 206 and following steps as described above.

If no conflict with a previously added "live" program is detected (No in step 214), the added program to be viewed "live" is placed in the playlist's time line at the program's transmission time (step 216), and it is determined (step 218) whether the added program to be viewed "live" temporally conflicts with any previously added recorded program in the playlist time line. If so (Yes in step 218), the previously added recorded program or programs are moved (step 220) to respective suitable gaps in the playlist (step 212).

The playlist now includes the added program to be viewed "live", and the flow can continue, for example to displaying on the TV 110 the programs in the temporal sequence given by the playlist. If there is no conflict between the added program to be viewed "live" and any previously added recorded program (No in step 218), the playlist now includes the added program to be viewed "live", and the flow can continue, for example to displaying on the TV 110 the programs in the temporal sequence given by the playlist.

After a playlist is generated and playback begins, it can be expected that the user will occasionally pause playback, e.g., in order to attend to another activity. In that case, a DVR 108, 118 is configured to begin recording any ongoing "live" program (step 216). Upon exiting the pause condition, a new playlist is computed as described above, thereby potentially rescheduling the remainder of the selected programs to optimize for conflicts and recordings. An exemplary method of generating a playlist after a pause is described in more detail below in connection with FIG. 6.

In carrying out step 204 when the user adds a program to a playlist, a processor can evaluate the selected program with respect to stored user-adjustable preferences and organize the added program as appropriate in accordance with one or more predetermined program types, e.g., programs that need not be viewed "live", such as pre-recorded episodes of TV series, and programs that need to be viewed "live", such as sports events. In this way, a program can be placed in the playlist based on user preferences, EPG data, and/or explicit user selection such that the program is played "live", i.e., when actually transmitted. For example, a user may prefer to watch ball games as they are broadcast.

It should be understood that many of the devices in FIG. 1 include electronic processors that can be suitably programmed to carry out the method of FIG. 2. For example, the TV portal (STB/DVR) 108 and service control portal 116 are in suitable positions to implement and direct other devices to implement methods in accordance with this invention. It is currently believed preferable to implement the methods in the remote control 102.

FIGS. 3A, 3B, 3C, 3D depict exemplary graphical representations of information on a display, such as the TV 110 or a screen on the remote control 102, in the course of carrying out methods in accordance with this invention. As shown in FIG. 3, the information is conveniently organized as an EPG area 310 stacked atop a Playlist area 320, although the artisan will understand that other representations and arrangements of the EPG and Playlist areas can be used.

The EPG area 310 advantageously presents program information arranged in a channel-time grid, with time presented on a horizontal axis divided into suitable increments, such as 60 minutes as depicted in FIG. 3. The Playlist area 320 similarly advantageously presents selected program information in an area-time grid, and three areas are depicted: Timeline, Live, and Recorded. The Timeline area shows the order and viewing start times and durations of selected programs. The Live area shows programs (which are also shown in the Timeline area) that will be viewed "live", which is to say, at the times the programs are presented. The Recorded area shows programs (which are also shown in the Timeline area) that will be recorded on a DVR 108, 118.

As depicted in FIG. 3, the EPG 310 shows a 60-minute program that is an episode of a series called CSI that is available on Channel 2 starting 30 minutes before a 120-minute program called Super Bowl that will be available on Channel 1 ("live"). Also shown in the EPG area 120 is a 30-minute program called News that will be available on Channel 3 30 minutes after the end of the Super Bowl program.

Figure 3A:
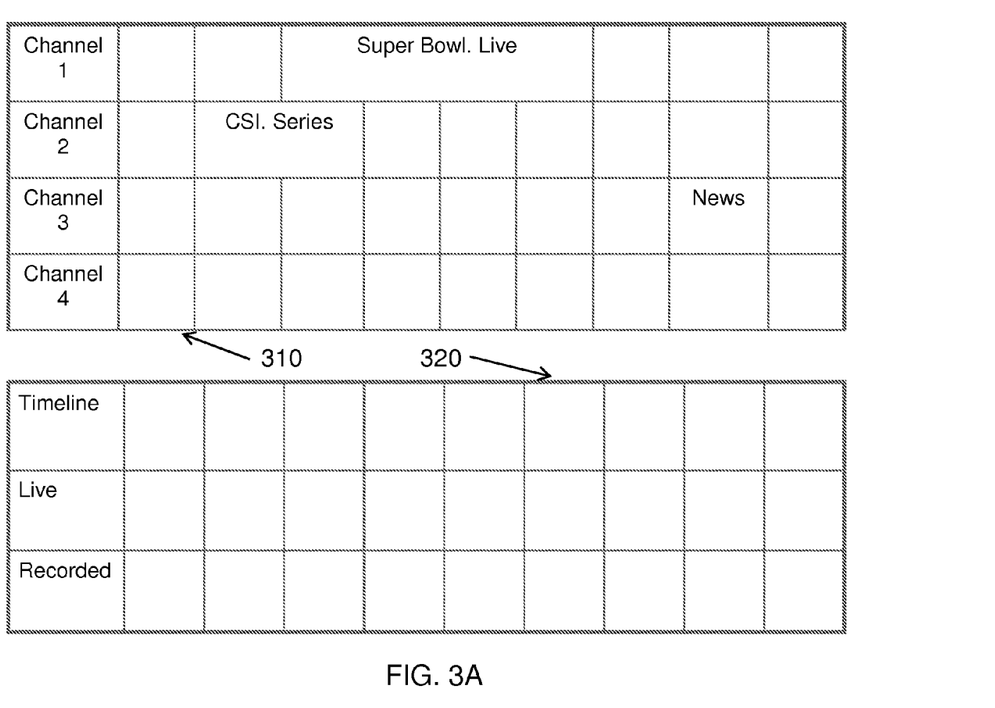
FIGS. 3A, 3B, 3C, 3D depict graphical representation of information including playlists generated by methods in accordance with this invention.
Figure 3B:
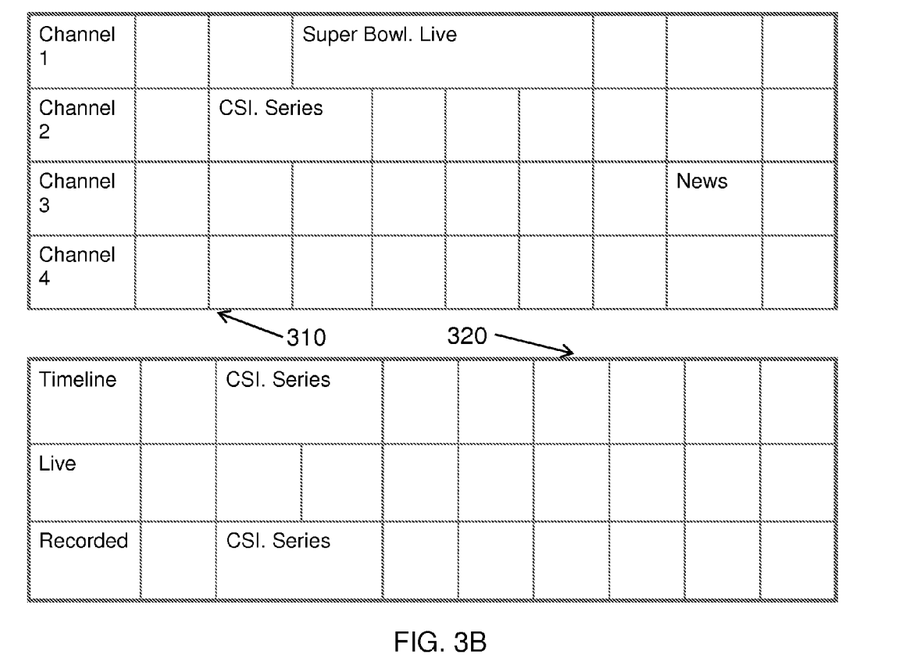

In adding programs to a playlist (step 202), a user advantageously can simply click and drag a program listed in the EPG from the EPG area 310 to the Playlist area 320. As depicted in FIG. 3B, the user has dragged the CSI program to the Playlist area 320, and a playlist has been generated by ordering the added program by start time in the Timeline area (step 210). The added CSI program is also shown in the Recorded area, which can result for example from either the user's dragging the program to the Recorded area or from a processor's evaluating the added program with respect to user-adjustable preferences that by default place in the Recorded area predetermined types of programs that need not be viewed "live", such as pre-recorded episodes of TV series (step 204).

Figure 3C:
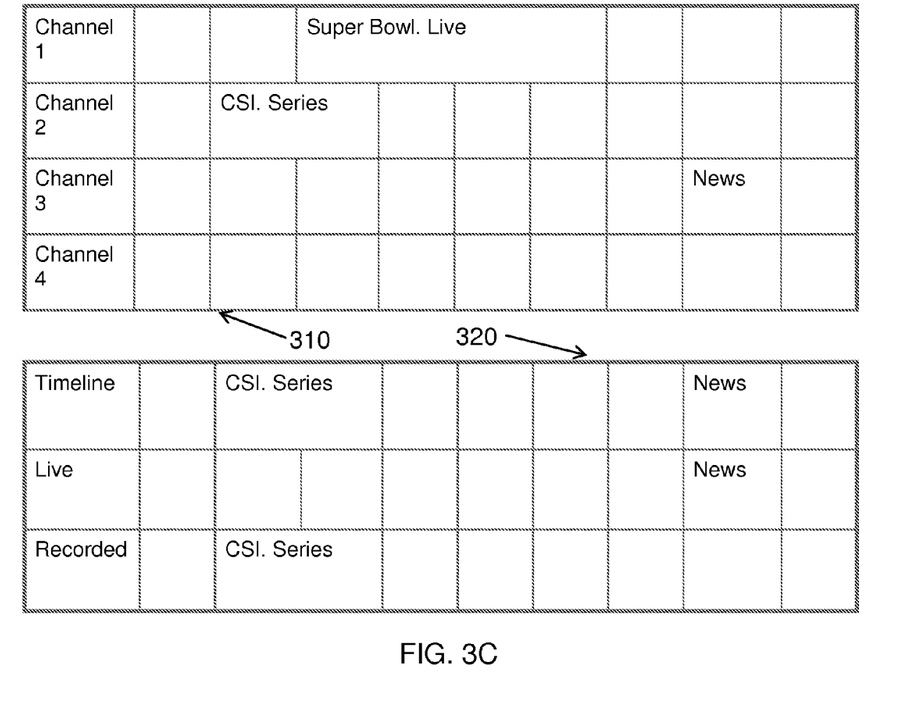

As depicted in FIG. 3C, the user has also dragged the News program to the Playlist area 320, and the playlist has been updated by ordering the added CSI and News programs by start time in the Timeline area (step 210). The added CSI program is shown in the Recorded area as described above, and the added News program is shown in the Live area, which can result for example from either the user's dragging the program to the Live area or from a processor's evaluating the added program with respect to user-adjustable preferences that by default place in the Live area predetermined types of programs that the user prefers to view "live", such as news programs (step 204). It will be noted that no temporal conflict (step 214) is determined to exist between the added News program and any other program in this example.

Figure 3D:
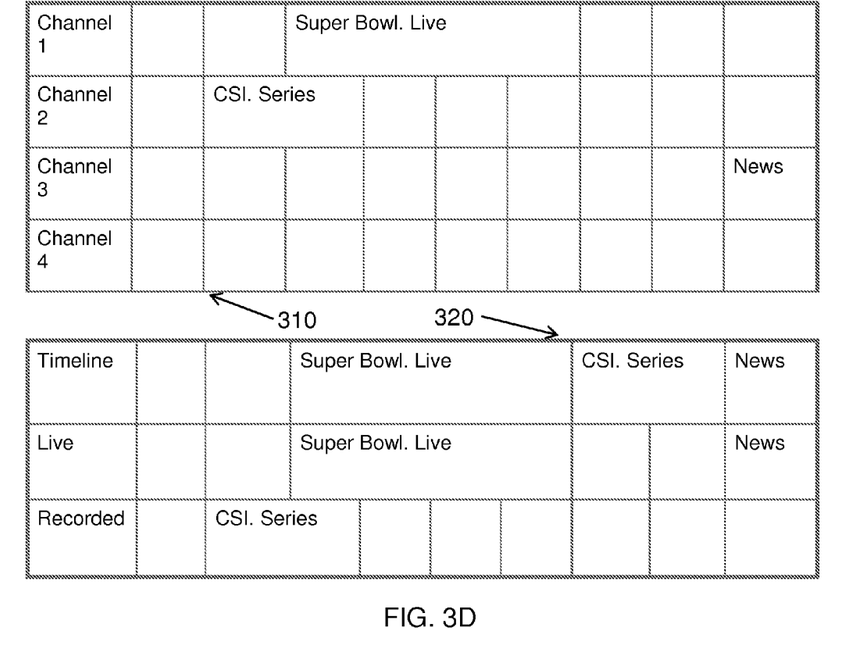

As depicted in FIG. 3D, the user has also dragged the Super Bowl program to the Playlist area 320, and an updated playlist has been generated. The added Super Bowl program is shown in the Live area, which can result for example from either the user's dragging the program to the Live area or from a processor's evaluating the added program with respect to user-adjustable preferences that by default place in the Live area predetermined types of programs that the user prefers to view "live", such as sports event programs. As the Super Bowl program temporally conflicts with the CSI program in the playlist (step 218), the CSI program is moved to fit in the next available temporal gap in the playlist that is long enough to accommodate it (steps 220, 212). In the example, that gap occurs between the added Super Bowl and previously added News programs, and the Timeline area indicates the playlist determined and the sequence in which the added programs will be available for viewing.

If a user explicitly or by application of stored user preferences tries to place two or more "live" programs that temporally conflict in the playlist depicted in the Timeline area, then one of the conflicting programs is kept in the Live area and one or more of the conflicting programs are indicated as recordings in the Recording area (step 214). The user can override that playlist by, for example, dragging a program from the Live area to the Recorded area or vice versa. It will be noted from the description above that a recorded program is placed in the playlist at the time the program is recorded if that time slot is free; otherwise, the program is placed in the next free slot in which it fits.

In compacting selected programs in steps 220, 212, many different re-arrangement strategies can be used to minimize temporal gaps in a playlist. After all selected programs have been placed in sequence, one or more temporal gaps can remain, and so the sequence is temporally compressed, if possible, to eliminate gaps and play a continuous sequence of media. For example, temporal gaps can be filled by starting with pairs or other groups of programs. It is currently believed that similar algorithms used for compacting information stored on computer disk drives can be adapted to compacting the temporal sequence of programs in a playlist.

Program playlists generated in accordance with this invention give users a convenient way to create playlists of sets of programs automatically, with minimal user planning and programming.

Figure 4:
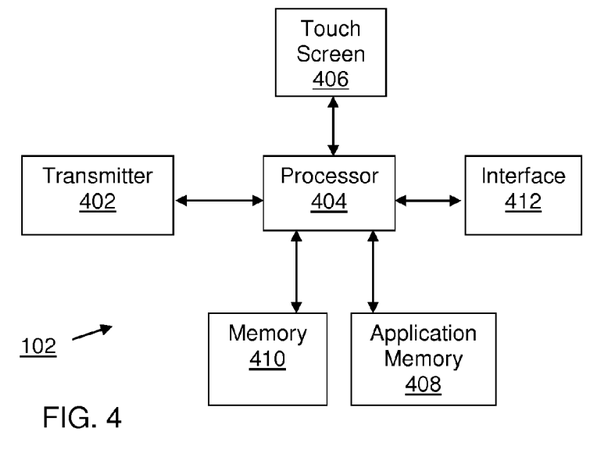
FIG. 4 is a block diagram of a remote control.

FIG. 4 is a block diagram of a typical remote control 102, such as a smart phone, tablet computer, etc., for controlling electronic devices and selecting programs as described in this application. The remote control 102 includes a transceiver 402 that is suitable for exchanging signals with the AP 104 and possibly the TV portal 108 depicted in FIG. 1. The signals are generated by a suitably programmed electronic processor 404, which may include one or more sub-processors, and which executes one or more software modules and applications to carry out the operations of the remote control 102 described above. User input to the remote control 102 is provided through a touch- or proximity-sensitive screen, joystick, keypad, or other input device 406, and information can be presented to the user on a screen 406. Software applications can be stored in a suitable application memory 408, and the remote control can cache desired information in a suitable memory 410. The remote control 102 may also include an interface 412 that can be used to connect the remote control to other components, such as a computer, LAN or WAN, etc.

A user can use the touch screen 406 to cause the processor 404, using information in the memories 408, 412, to generate the appropriate control command(s) for selecting programs for a playlist and transmit the command(s) via the transceiver 402 to the appropriate electronic device, for example, the TV portal 108.

Figure 5:
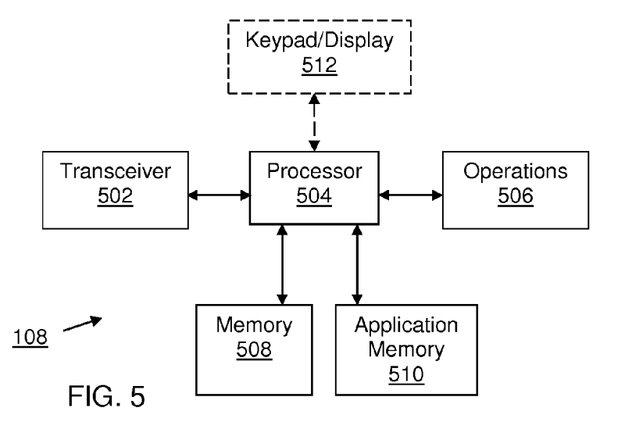
FIG. 5 is a block diagram of an electronic device.

FIG. 5 is a block diagram of a TV portal 108 for receiving program selections by user actions on the remote control 102 as described in this application. The portal device 108 includes a transceiver 502 that is suitable for sending and receiving signals via the LAN 106 and/or transmitted directly to the portal 108 by the remote control 102. Received signals are handled by a suitable electronic processor 504, which may include one or more sub-processors, and which executes one or more software modules and applications to carry out the operations of the device 106 described above. In particular, the processor 504 and memories 508, 510 are configured or programmed to carry out methods of generating playlists as described above, which is indicated by operations 506, according to signals received from the remote control 102. The processor 504 can carry out those operations 506 with information stored in a suitable memory 508 and software applications that can be stored in a suitable application memory 510. It will be understood that the portal device 108 can include a keypad/display 512 for user input/output to the processor 504.

Figure 6:
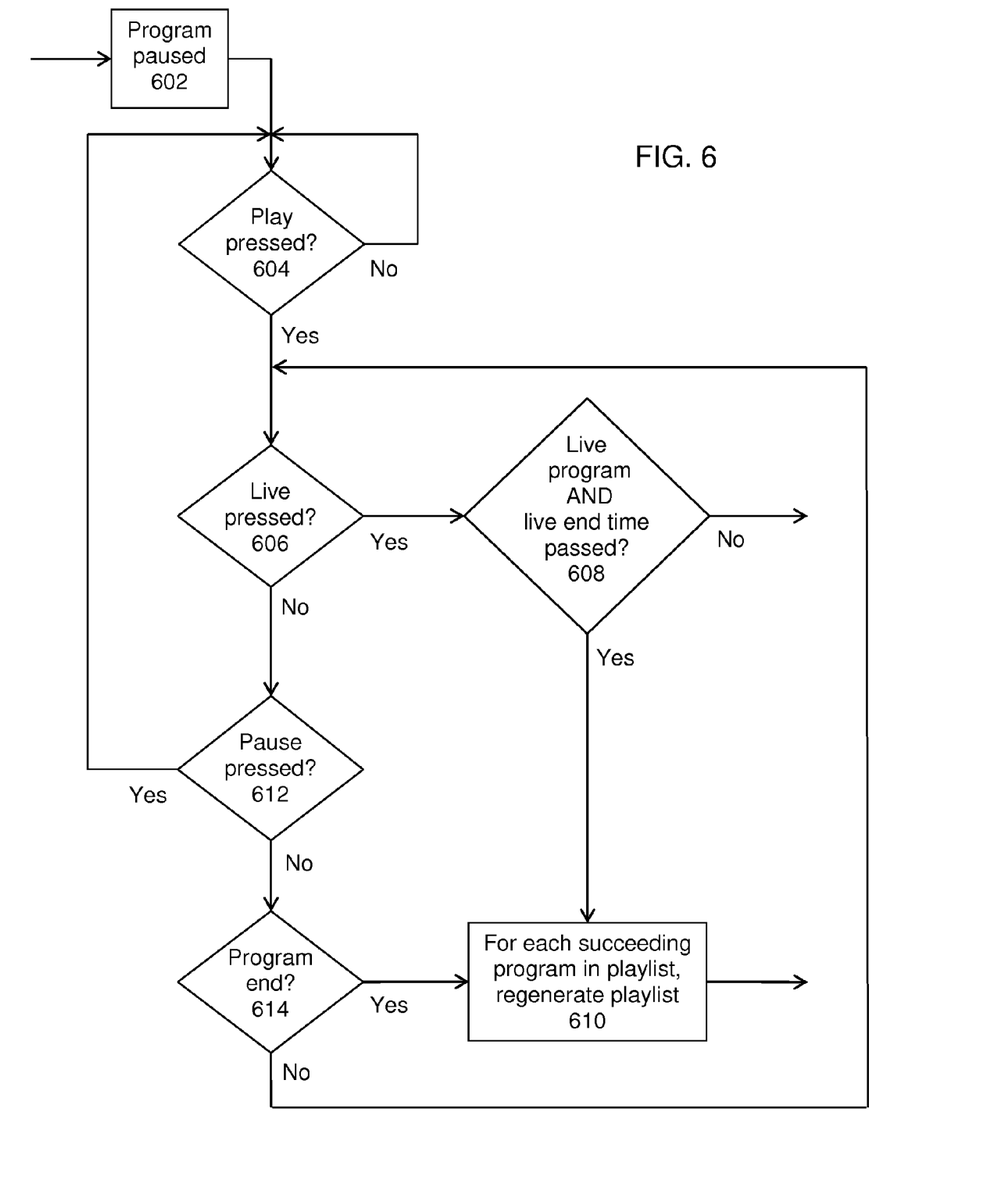
FIG. 6 is a flow chart of another exemplary method of generating a playlist of media information.

FIG. 6 is a flow chart of an exemplary method of generating a playlist of media information after a pause in accordance with this invention that can be carried out by one or more programmable electronic processors in the arrangement 100. After viewing of a playlist media program is paused (step 602), it is determined (step 604) whether viewing has been restarted from the point it was paused, e.g., by the user's pushing a suitable "play" button on the remote control 102. If viewing has not been restarted (No in step 604), the flow simply returns to step 604, but if viewing has been restarted (Yes in step 604), it is determined whether the user has chosen to escape from resuming viewing a paused "live" media program in favor of viewing the "live" program in real time (step 606).

If viewing a "live" media program in real time is chosen (Yes in step 606), it is determined (step 608) whether the media program is a "live" media program in the previously generated playlist and whether the end time of that media program has occurred. If neither condition is true (No in step 608), the previously generated playlist can simply continue, but if either or both conditions are true (Yes in step 608), the previously generated playlist is replaced by a newly generated playlist (step 610) using a method such as that depicted in FIG. 2, taking the previously selected media programs one by one to generate, or regenerate, the playlist.

If resuming viewing a media program at the point it was paused is chosen (No in step 606), it is determined (step 612) whether viewing has been paused, e.g., by the user's pushing a suitable "pause" button on the remote control 102. If viewing has been paused (Yes in step 612), the flow returns to step 604. If viewing has not been paused (No in step 612), it is determined whether the media program being viewed has ended (step 614). If the media program has not ended, the flow returns to step 606, but if the media program has ended (Yes in step 614), the previously generated playlist is replaced by a newly generated playlist (step 610) as described above.

As illustrated by FIG. 6, a new media program playlist is generated for all media programs that remain in a current playlist after a currently being viewed program if either a "live" program is paused and resumes to the real time (Yes in step 608), or any type of program is paused and resumed. Thus, the method depicted in FIG. 6 may or not result in generating a new, reorganized playlist.

It will be appreciated that procedures described above are carried out repetitively as necessary, for example, to respond to the time-varying nature of communication signals exchanged by transmitters and receivers. Assemblies implementing this invention can be included in, for example, computers, servers, wireless communication network base stations, and the like.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), and an erasable programmable read-only memory (EPROM or Flash memory).

Thus, the invention may be embodied in many different forms, not all of which are described above, and all such forms are contemplated to be within the scope of the invention.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of generating a playlist of media programs in an arrangement of electronic media devices that includes at least one programmable media recorder, comprising:
   (a) adding a media program to a playlist maintained by an electronic processor;
   (b) determining by the electronic processor whether the added media program is preferred to be viewed in a first condition or in a second condition;
   (c) if the electronic processor determines that the added media program is preferred to be viewed in the first condition:
      setting the programmable media recorder to record the added media program;
      determining whether the added media program temporally conflicts with any previously added program in the playlist;
      if it is determined that the added media program does not temporally conflict with any previously added program in the playlist, placing the added media program in the playlist at a transmission time of the added media program; and
      if it is determined that the added media program temporally conflicts with a previously added program in the playlist, determining a temporal gap in the playlist long enough to accommodate the added media program, and placing the added media program in the temporal gap; and
   (d) if the electronic processor determines that the added media program is preferred to be viewed in the second condition:
      determining whether the added media program temporally conflicts with any previously added program in the playlist;
      if it is determined that the added media program temporally conflicts with a previously added program in the playlist that has been determined to be viewed in the second condition, carrying out step (c);
      if it is determined that the added media program does not temporally conflict with any previously added program in the playlist that has been determined to be viewed in the second condition, placing the added media program in the playlist at a transmission time of the added media program;
      determining whether the added media program temporally conflicts with any previously added program in the playlist that has been determined to be viewed in the first condition; and
      if it is determined that the added media program temporally conflicts with a previously added program in the playlist that has been determined to be viewed in the first condition, determining a temporal gap in the playlist long enough to accommodate the previously added media program that has been determined to be viewed in the first condition, and placing in the temporal gap the previously added media program that has been determined to be viewed in the first condition.

2. The method of claim 1, wherein a media program that is preferred to be viewed in the second condition is a media program that is preferred to be viewed at a time the program is transmitted.

3. The method of claim 1, further comprising, in response to pausing viewing a media program in the playlist, repeating steps (a) through (d), with the paused media program being the added media program in step (a).

4. The method of claim 3, wherein repeating steps (a) through (d) comprises:
   (e) determining whether viewing has been restarted;
   (f) if viewing has been restarted, the media program is preferred to be viewed in the second condition, and viewing the media program is to be restarted in real time, determining whether the media program is a media program of the second condition in the playlist and whether an end time of the media program has occurred;
      if the media program is not a media program of the second condition in the playlist and the end time of the media program has not occurred, continuing the playlist; and
      if the media program is a media program of the second condition in the playlist and/or the end time of the media program has occurred, generating a new playlist by repeating steps (a) through (d) for each media program in the playlist.

5. The method of claim 1, wherein determining whether an added media program is preferred to be viewed in a first condition or in a second condition comprises evaluating the added media program with respect to at least one user-adjustable preference and at least one predetermined program type.

6. The method of claim 5, wherein the at least one predetermined program type comprises a first type that need not be viewed live and a second type that needs to be viewed live.

7. The method of claim 6, wherein an evaluation of the added media program with respect to the at least one predetermined program type can be overridden.

8. An arrangement of electronic media devices for generating a playlist of media programs, comprising:
   at least one programmable media recorder; and
   at least one programmable electronic processor in communication with the at least one programmable media recorder;
   wherein the processor is configured to:
   (a) add a media program to a playlist;
   (b) determine whether the added media program is preferred to be viewed in a first condition or in a second condition;
   (c) if the processor determines that the added media program is preferred to be viewed in the first condition:
      set the programmable media recorder to record the added media program;
      determine whether the added media program temporally conflicts with any previously added program in the playlist;
      if it is determined that the added media program does not temporally conflict with any previously added program in the playlist, place the added media program in the playlist at a transmission time of the added media program; and if it is determined that the added media program temporally conflicts with a previously added program in the playlist, determine a temporal gap in the playlist long enough to accommodate the added media program, and place the added media program in the temporal gap; and (d) if the processor determines that the added media program is preferred to be viewed in the second condition:

determine whether the added media program temporally conflicts with any previously added program in the playlist;

if it is determined that the added media program temporally conflicts with a previously added program in the playlist that has been determined to be viewed in the second condition, carry out (c);

if it is determined that the added media program does not temporally conflict with any previously added program in the playlist that has been determined to be viewed in the second condition, place the added media program in the playlist at a transmission time of the added media program;

determine whether the added media program temporally conflicts with any previously added program in the playlist that has been determined to be viewed in the first condition; and if it is determined that the added media program temporally conflicts with a previously added program in the playlist that has been determined to be viewed in the first condition, determine a temporal gap in the playlist long enough to accommodate the previously added media program that has been determined to be viewed in the first condition, and place in the temporal gap the previously added media program that has been determined to be viewed in the first condition.

9. The arrangement of claim 8, wherein a media program that is preferred to be viewed in the second condition is a media program that is preferred to be viewed at a time the program is transmitted.

10. The arrangement of claim 8, wherein the processor is further configured, in response to pausing viewing a media program in the playlist, repeat (a) through (d), with the paused media program being the added media program in (a).

11. The arrangement of claim 10, wherein the processor is configured to repeat (a) through (d) by at least:

(e) determining whether viewing has been restarted;

(f) if viewing has been restarted, the media program is preferred to be viewed in the second condition, and viewing the media program is to be restarted in real time, determining whether the media program is a media program of the second condition in the playlist and whether an end time of the media program has occurred;

if the media program is not a media program of the second condition in the playlist and the end time of the media program has not occurred, continuing the playlist; and if the media program is a media program of the second condition in the playlist and/or the end time of the media program has occurred, generating a new playlist by repeating steps (a) through (d) for each media program in the playlist.

12. The arrangement of claim 8, wherein the processor is configured to determine whether an added media program is preferred to be viewed in a first condition or in a second condition by evaluating the added media program with respect to at least one user-adjustable preference and at least one predetermined program type.

13. The arrangement of claim 12, wherein the at least one predetermined program type comprises a first type that need not be viewed live and a second type that needs to be viewed live.

14. The arrangement of claim 13, wherein the processor is further configured to override, in response to a command, an evaluation of the added media program with respect to the at least one predetermined program type.

15. A non-transitory computer-readable medium having stored instructions that, when executed by a computer, cause the computer to carry out a method of generating a playlist of media programs in an arrangement of electronic media devices that includes at least one programmable media recorder, wherein the method comprises:

(a) adding a media program to a playlist maintained by an electronic processor;

(b) determining by the electronic processor whether the added media program is preferred to be viewed in a first condition or in a second condition;

(c) if the electronic processor determines that the added media program is preferred to be viewed in the first condition:

setting the programmable media recorder to record the added media program;

determining whether the added media program temporally conflicts with any previously added program in the playlist;

if it is determined that the added media program does not temporally conflict with any previously added program in the playlist, placing the added media program in the playlist at a transmission time of the added media program; and if it is determined that the added media program temporally conflicts with a previously added program in the playlist, determining a temporal gap in the playlist long enough to accommodate the added media program, and placing the added media program in the temporal gap; and (d) if the electronic processor determines that the added media program is preferred to be viewed in the second condition:

determining whether the added media program temporally conflicts with any previously added program in the playlist;

if it is determined that the added media program temporally conflicts with a previously added program in the playlist that has been determined to be viewed in the second condition, carrying out step (c);

if it is determined that the added media program does not temporally conflict with any previously added program in the playlist that has been determined to be viewed in the second condition, placing the added media program in the playlist at a transmission time of the added media program;

determining whether the added media program temporally conflicts with any previously added program in the playlist that has been determined to be viewed in the first condition; and if it is determined that the added media program temporally conflicts with a previously added program in the playlist that has been determined to be viewed in the first condition, determining a temporal gap in the playlist long enough to accommodate the previously added media program that has been determined to be viewed in the first condition, and placing in the temporal gap the previously added media program that has been determined to be viewed in the first condition.

16. The non-transitory computer-readable medium of claim 15, wherein a media program that is preferred to be viewed in the second condition is a media program that is preferred to be viewed at a time the program is transmitted.

17. The non-transitory computer-readable medium of claim 15, wherein the method further comprises, in response to pausing viewing a media program in the playlist, repeating steps (a) through (d), with the paused media program being the added media program in step (a).

18. The non-transitory computer-readable medium of claim 15, wherein repeating steps (a) through (d) comprises:

(e) determining whether viewing has been restarted;

(f) if viewing has been restarted, the media program is preferred to be viewed in the second condition, and viewing the media program is to be restarted in real time, determining whether the media program is a media program of the second condition in the playlist and whether an end time of the media program has occurred;

if the media program is not a media program of the second condition in the playlist and the end time of the media program has not occurred, continuing the playlist; and if the media program is a media program of the second condition in the playlist and/or the end time of the media program has occurred, generating a new playlist by repeating steps (a) through (d) for each media program in the playlist.

19. The non-transitory computer-readable medium of claim 15, wherein determining whether an added media program is preferred to be viewed in a first condition or in a second condition comprises evaluating the added media program with respect to at least one user-adjustable preference and at least one predetermined program type.

20. The non-transitory computer-readable medium of claim 19, wherein the at least one predetermined program type comprises a first type that need not be viewed live and a second type that needs to be viewed live.

21. The non-transitory computer-readable medium of claim 20, wherein an evaluation of the added media program with respect to the at least one predetermined program type can be overridden.

* * * * *